United States Patent
Vora et al.

(10) Patent No.: US 8,647,509 B2
(45) Date of Patent: Feb. 11, 2014

(54) SEAWATER DESALINATION PLANT AND PRODUCTION OF HIGH PURITY SALT

(75) Inventors: Nishith Vora, Trevose, PA (US); Irving Elyanow, Lexington, MA (US); Giuseppe Chiappa, Milan (IT); Giovanni Radice, Milan (IT); Luca Mor, Milan (IT)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 12/815,711

(22) Filed: Jun. 15, 2010

(65) Prior Publication Data

US 2011/0303607 A1    Dec. 15, 2011

(51) Int. Cl.
*B01D 61/16*    (2006.01)
*C02F 1/66*    (2006.01)
*B01D 61/22*    (2006.01)

(52) U.S. Cl.
USPC ............................ 210/639; 210/651; 210/749

(58) Field of Classification Search
None
See application file for complete search history.

(56) References Cited

U.S. PATENT DOCUMENTS

| | | | |
|---|---|---|---|
| 3,676,067 A | | 7/1972 | Tabata et al. |
| 4,036,749 A | | 7/1977 | Anderson |
| 5,238,574 A | * | 8/1993 | Kawashima et al. ......... 210/652 |
| 5,254,257 A | * | 10/1993 | Brigano et al. ............... 210/639 |
| 6,030,535 A | | 2/2000 | Hayashi et al. |
| 6,398,965 B1 | | 6/2002 | Arba et al. |
| 6,776,972 B2 | | 8/2004 | Vohra et al. |
| 7,083,730 B2 | | 8/2006 | Davis |
| 7,097,769 B2 | | 8/2006 | Liberman et al. |
| 7,198,722 B2 | | 4/2007 | Hussain |
| 7,459,088 B2 | | 12/2008 | Davis |
| 8,038,883 B2 | * | 10/2011 | Bargeman et al. ............ 210/639 |
| 2004/0065614 A1 | | 4/2004 | Gordon et al. |
| 2006/0157410 A1 | | 7/2006 | Hassan |
| 2010/0163471 A1 | | 7/2010 | Elyanow et al. |

FOREIGN PATENT DOCUMENTS

| | | |
|---|---|---|
| GB | 2 395 946 A | 6/2004 |
| WO | WO 03/106348 A1 | 12/2003 |
| WO | WO 2006/045718 A1 | 5/2006 |

OTHER PUBLICATIONS

GE Infrastructure Water & Process Technologies, Membranes Powerpoint presentation, 9 pages.
Kurihara et al., "High Recovery / High Pressure Membranes for Brine Conversion SWRO Process Development and Its Performance Data", European Desalination Society and International Water Services Association, 125 (1999) 9-15.
Turek, "Seawater Desalination and Salt Production in a Hybrid Membrane-Thermal Process", Desalination vol. 153, pp. 173-177, 2002.

(Continued)

*Primary Examiner* — Katherine Zalasky
(74) *Attorney, Agent, or Firm* — Wegman, Hessler & Vanderburg

(57) ABSTRACT

The present invention discloses an integrated desalination and salt plant for the production of a salt or slurry product of high purity. The reject stream from the desalination plant is used as the feed stream for the salt plant. The salt plant feed stream is filtered to effectively remove sulfate, which prevents scale formation in the salt plant equipment. The filtering may also reduce the level of calcium, magnesium, bicarbonate, or other components of the feed which may also prevent scale formation in the salt plant equipment. The salt plant produces a high purity salt product without the use of chemical purification.

11 Claims, 2 Drawing Sheets

(56) References Cited

OTHER PUBLICATIONS

Miller, "Review of Water Resources and Desalination Technologies", Sand Report, Sandia National Laboratories, 54 pages, Mar. 2003.

GE Water & Process Technologies, "Seasoff Series—NF Elements for Sulfates and Hardness Removal from Seawater", Fact Sheet, 2 pages, Apr. 2008.

\* cited by examiner

Integrated Desaliantion & Salt Plant Design with No Chemical Purification

| | Desalination Plant Reject | NF Permeate | NF Reject | % Decrease between Desalination Reject and NF Permeate |
|---|---|---|---|---|
| Factor Temperature, C | 31 | 32 | 32 | |
| | mg/l | mg/l | mg/l | |
| Ca | 879 | 84 | 951 | 90% |
| Mg | 2451 | 62 | 1737 | 97% |
| Na | 20871 | 17890 | 34041 | 14% |
| K | 793 | 680 | 1294 | 14% |
| Sr | 12 | 1 | 13 | 90% |
| Li | 0 | 0 | 0 | 0% |
| Ba | 0 | 0 | 0 | 98% |
| Cl | 37595 | 28597 | 58537 | 24% |
| HCO3 | 292 | 29 | 498 | 90% |
| SO4 | 5207 | 1 | 478 | 99.99% |
| Br | 0 | 0 | 0 | 0% |
| NO3 | 33 | 31 | 43 | 6% |
| F | 2 | 2 | 3 | 14% |
| PO4 | 0 | 0 | 0 | 0% |
| I | 0 | 0 | 0 | 0% |
| Boron | 8 | 8 | 8 | 0% |
| SiO2 | 20 | 20 | 20 | 0% |
| CO2 | 3 | 3 | 3 | 0% |
| NaCl | 53084 | 45502 | 86583 | 14% |
| TDS | 68162 | 47404 | 97623 | 30% |

FIG. 2

SEAWATER DESALINATION PLANT AND PRODUCTION OF HIGH PURITY SALT

BACKGROUND OF THE INVENTION

1. Field of the Invention

This invention relates generally to desalination, salt production, and water production. In particular, it relates to a process for converting a saltwater desalination reject stream into pure salt, where this desalination process can be via thermal process or via membrane process.

2. Description of Related Art

As is stated in U.S. patent application Ser. No. 12/345,856 filed on Dec. 30, 2008, herein incorporated by reference, for centuries, common salt has been produced by evaporative concentration of seawater or of another naturally occurring brine, typically by using open-air evaporation lagoons or thermal concentration equipment and processes. A number of modern industrial processes require salt of substantially high purity, such as a sodium chloride salt substantially free of undesirable chemical or taste components. Such high purity salt may be mined from some natural geological formations, and may also be obtained from other saline waters by concentration and treatment steps that remove the principal unwanted impurities present in a starting solution.

Potable, high-quality or pure water has also historically been produced, when fresh water is not available, from natural saline or brackish waters, originally by thermal processes such as freezing or distillation, and more recently by membrane processes such as reverse osmosis or membrane vapor permeation, and/or by hybrid membrane/thermal processes. When starting with a saline feed, all of these water production processes recover or purify only a fraction of the water present in the feed, and generally produce waste brine that is substantially more concentrated than the original feed stream.

One problem is that seawater and other natural saline waters contain many solutes and impurities, so the salt-enriched side streams of a pure water production process, i.e., the concentrated reject of a reverse osmosis water treatment, or the residue of a distillation process, include other solids that both limit flux or treatment rate and/or recovery of the water side and must be removed on the brine side if a high quality salt is desired. These dissolved solids can be corrosive and scale forming in the salt plant evaporators and crystallizers. Currently, chemicals are introduced on the brine side to prevent or reduce the scale formation. These chemicals are costly and reduce the salt purity.

Accordingly, a need exists for a non-chemical purification solution to reduce or prevent scale formation in the salt plant.

SUMMARY OF THE INVENTION

The present invention concerns a saltwater desalination and salt plant. The desalination plant has a feed stream and a reject stream. The desalination plant reject stream is used as the salt plant feed stream. A filter selectively removes scaling species from said salt plant feed stream. Additional equipment processes the filtered salt plant feed stream into a high purity moist salt or slurry.

BRIEF DESCRIPTION OF THE DRAWINGS

These and other aspects of the invention will be understood from the description and claims herein, taken together with the drawings showing details of construction and illustrative embodiments, wherein:

FIG. 2 is a water quality table showing representative concentrations of components in a salt plant feed and the corresponding filter permeate streams calculated for one representative plant.

DETAILED DESCRIPTION OF THE INVENTION

Figure 1:
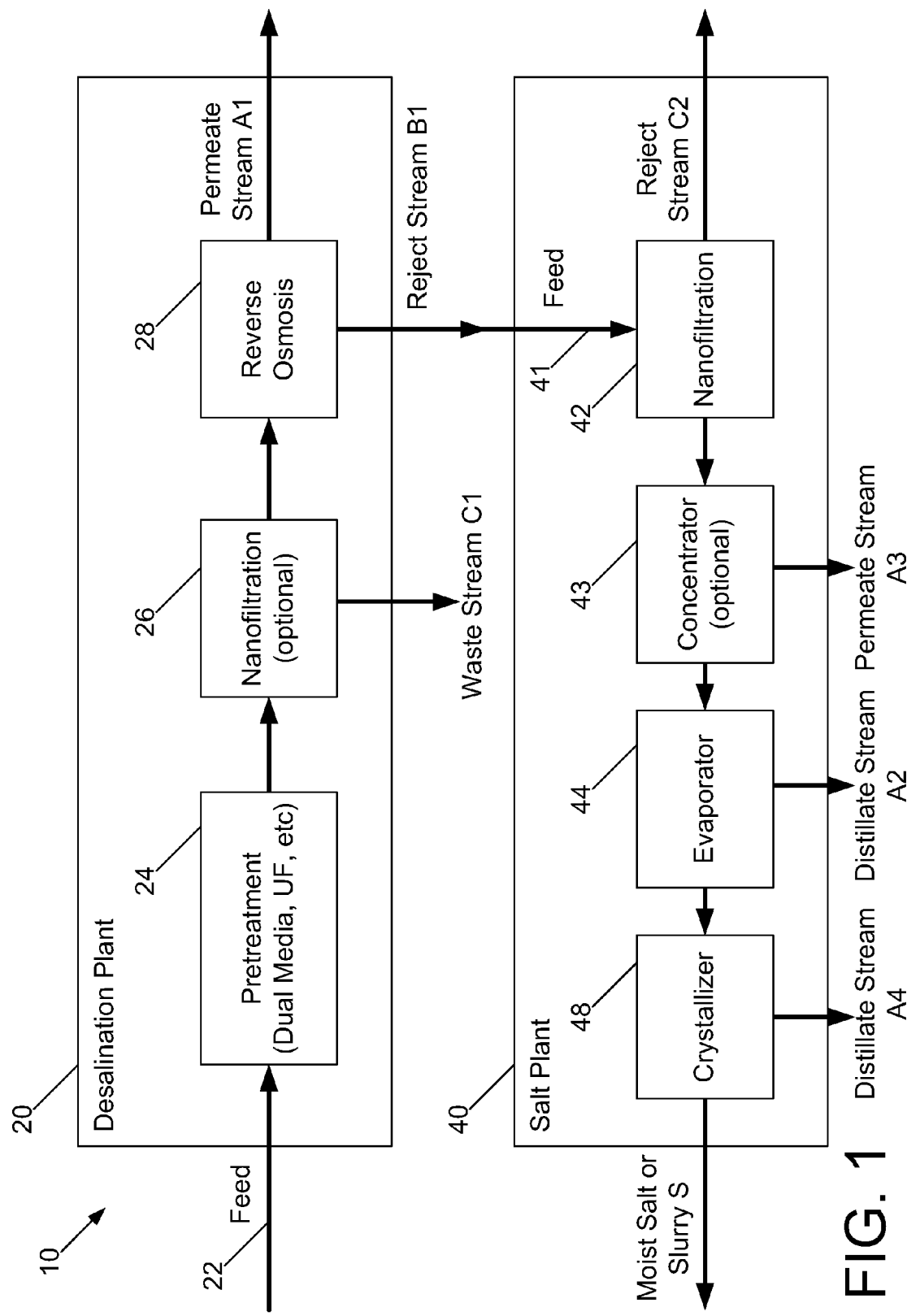
FIG. 1 schematically illustrates a system for the integrated production of salt and water outputs in accordance with one embodiment of the present invention.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

The present invention discloses an integrated plant for the production of both pure water and a salt or slurry product, operable to effectively provide salt of high purity while reducing or preventing scale formation in evaporators and crystallizers in the salt plant without the use of chemical purification.

Disclosed in FIG. 1 is a combination desalination and salt plant 10 comprised of a desalination plant 20 and a salt plant 40. In this embodiment, desalination plant 20 is comprised of a seawater or brackish water feed 22, pure water permeate steam A1, reject stream B1, and an optional waste stream C1. The desalination plant is further comprised of a pretreatment section 24, an optional nanofiltration (NF) section 26, and a reverse osmosis (RO) section 28.

In operation, feed 22 passes through the pretreatment section 24 before progressing to the optional NF section 26. The NF section 26 produces waste stream C1 and directs feed stream 22 into the RO section 28. RO section 28 produces a pure water permeate stream A1 and a reject stream B1. Reject stream B1 becomes salt plant feed stream 41. In some embodiments in which the NF section 26 is not present, feed 22 passes from the pretreatment section 24 into the RO section 28.

Pretreatment section 24 is of a known type (e.g., coarse screen, media filter, flocculation and clarification, ultrafiltration, dual media, and/or other pretreatment processes) and removes suspended solids and a substantial portion of organic matter.

Desalination plant 20 can be any standard saltwater reverse osmosis (SWRO) desalination plant or any standard thermal Multiple Effect Distillation (MED) desalination plant or any standard thermal Multi-Stage Flash (MSF) desalination plant having a reject stream B1, which desalinates water taken from a saltwater source, such as an ocean, sea, or brackish body of water.

The salt plant 40 is comprised of a feed stream 41, a distillate stream A2, a reject stream C2 and moist salt or slurry S. The salt plant 40 is further comprised of a NF section 42, an optional concentrator section 43, an evaporator section 44, and a crystallizer section 48. In some embodiments, optional concentrator section 43 is an RO section.

In operation, feed 41 passes through NF section 42 and exits as permeate before progressing to the optional concentrator section 43. The NF section 42 also produces waste stream C2 and optional concentrator section 43 produces permeate stream A3. After exiting optional concentrator section 43 as concentrate, feed 41 proceeds to evaporator section 44 and exits as concentrate before entering crystallizer section 48. Evaporator section 44 also produces a distillate stream A2. Feed 41 exits crystallizer section 48 as a moist salt or slurry S. In some embodiments in which concentrator section 43 is not present, feed 41 passes from NF section 42 directly into evaporator section 44.

In FIG. 1, NF section 42 selectively removes scaling species from feed 41. Such scaling species can include hardness ions (e.g., calcium and magnesium) and sulfates (e.g., native di- and polyvalent sulfur ions). NF section 42 effects a substantial reduction in sulfates, removes bivalent ions while at least somewhat selectively passing monovalents. NF section 42 operates at a relatively low feed pressure, and preferably includes several stages so that NF section 42 permeate passed along feed 41 represents from about 70% to about 80% or more of the feed volume, achieving high water recovery. This NF section 42 permeate forms an intermediate permeate stream that comprises feed 41 that is substantially free of scaling sulfate, relatively depleted of bivalent ions, and rich in monovalent salts, primarily NaCl, with a total dissolved solids (TDS) that is about ⅔ that of the feed. Preferably NF section 42 is comprised of a 2-Pass Nanofiltration system. NF section 42 is constructed and operates in a similar fashion as NF section 26 in U.S. patent application Ser. No. 12/345,856, which is incorporated by reference above.

In one embodiment, NF section 42 rejects anions with more than one negative charge, rejects cations depending on shape and size, rejects organic if molecular weight is >200-300 Daltons. The pore sizes are on the order of about 0.0009-0.0085 microns. Further, the typical operating pressure of NF section 42 is about 70-400 psig with a maximum operating pressure of about 600 psig. The maximum pressure drop of NF section 42 is 12 psi over an element and 50 psi per housing. The typical operating flux of NF section 42 is about 8-20 GFD.

Further, in some embodiments, NF section 42 can be operated at a reduced pH, preferably at a pH of less than 7.0, to enhance calcium and magnesium removal. Additionally, in some embodiments, NF section 42 rejects less than about 30% of chloride, greater than about 90% of sulfate, greater than about 68% of calcium, and greater than about 77% of magnesium average per pass.

Accordingly, in one aspect of the invention, NF section 42 eliminates the requirement for a separate chemical purification stage to prevent scaling in equipment downstream of NF section 42, such as optional membrane-based concentrator 43, evaporator 44, and crystallizer 48. Further, NF section 42 allows salt to be continuously recovered by crystallization at purity above 99% that meets an intended purity standard (e.g., NaCl purity level and absence of critical contaminants) for chlor-alkali, soda ash production or other user applications.

Further NF section 42 allows optional concentrator section 43 to operate on the NF section 42 permeate at high recovery without scaling and with no antiscalant to produce a pure water output and a substantially concentrated reject stream.

The optional RO section 43 can be a seawater RO, brackish water RO, or other RO system. NF section 42 allows the RO section 43 to operate on NF section 42 permeate at high recovery without scaling and with no need for antiscalant, to produce a pure water output and a substantially concentrated reject stream. By way of example, a 2-pass NF section 42 may operate at from about 70% to about 80% recovery, and the RO section 43 may include a third stage high pressure brine recovery stage to operate at from about 70% to about 80% or more recovery on this NF permeate, giving an overall recovery of from about 50% to about 70% or more in the salt plant 40.

Further, concentration of the RO section 43 reject stream may be by a thermal process or other evaporator section 44. Evaporator section 44 can also include a concentrator such as an evaporative brine concentrator, preferably a unit such as a falling film evaporator, and may operate with a vapor recompressor unit for enhanced energy efficiency and augmented water recovery. A mechanical vapor compression unit may be used to enhance evaporative efficiency while recovering additional water in this section. In one embodiment, evaporator section 44 is a mechanical vapor compressor that produces additional pure water or distillate A2 while further concentrating feed 41. By way of example, from about 70% to about 90% or more of the water present in the RO section reject stream B1 that passes to the concentration/salt production stage may be recovered as additional water.

In crystallizer section 48, the high purity salt product is crystallized and additional pure water of distillate A4 is produced. The high purity salt may be extracted as a moist salt or as a salt slurry from an evaporator/centrifuge loop in which the stream temperate may be easily controlled, e.g., with mechanical vapor recompression, to provide supersaturated salt solution and optimize sodium chloride crystallization. Crystallizer section 48 may be driven by crystal seeding, allowing efficient and continuous take-off of the salt output from a precipitation and centrifugation loop, and both the crystallization and purity of the product may be enhanced by allowing a small periodic blowdown from the loop to keep remaining unwanted species, such as potassium, below saturation in the crystallizer section 48, and below a level that might impair crystallization or product quality. For this, a purge under about 1% of the initial brine feed volume or 3% of the crystallizer volume suffices, resulting in a near zero-liquid discharge (ZLD) process from producing a highly purified NaCl product.

Stated alternatively, in desalination plant 20, feed 22 passes downstream to pretreatment section 24, which removes suspended solids and a substantial portion of organic matter from feed 22. Feed 22 then travels downstream into optional NF section 26. Feed 22 exits NF section 26 as permeate and concentrate exits NF section 26 as waste stream C1. RO section 28 is located downstream of NF section 26 and receives feed 22 from NF section 26 located upstream. Permeate exits RO section 28 as permeate stream A1 and concentrate exits RO section 28 as reject stream B1. Downstream, reject stream B1 exits desalination plant 20, becomes salt plant feed 41, and enters salt plant 40.

After entering salt plant 40, feed 41 travels downstream into NF section 42. Feed 41 exits NF section 42 as permeate and concentrate exits NF section 42 as reject stream C2. Optional concentrator section 43 is located downstream of NF section 42 and receives feed 41 from NF section 42. Permeate exits concentrator section 43 as permeate stream A3, and concentrate exits as feed 41 and travels downstream to evaporator section 44. Evaporator section 44 receives feed 41 from concentrator section 43 located upstream. Evaporator section 44 removes water from feed 41 and sends feed 41 downstream to crystallizer section 48. The water removed from feed 41 by evaporator section 44 forms distillate stream A2. Crystallizer section 48 receives feed 41 from evaporator section 44 located upstream. Crystallizer section 48 removes water from feed 41 and outputs a moist salt or slurry S downstream. The water removed from feed 41 by crystallizer section 48 forms distillate stream A4. It is anticipated that some embodiments can include a dryer located downstream from crystallizer section 48 to receive moist salt or slurry S and produce dry salt.

Turning to FIG. 2 which shows some representative operating conditions for salt plant 40 of FIG. 1, NF section 42 effectively removes sulfate and may greatly reduce the level of calcium, magnesium, bicarbonate, or other components of the feed 41. FIG. 2 shows the concentrations of principal dissolved species in the feed 41 and NF section 42 permeate streams. At least about 99% of the sulfate, about 90% of the calcium, and about 95% of the magnesium from feed 41 are removed by NF section 42. Preferably, NF section 42 removes at least about 99.9% of the sulfate, about 95% of the calcium, and about 98% of the magnesium. Further, NF section 42 passes at least about 50% of the chloride in feed 41. Preferably, NF section 42 passes at least about 70% of the chloride in feed 41. The NF membrane may be a membrane such as, but not limited to, the ones commonly sold for sulfate removal by The Dow Chemical Company (Midland, Mich.) and GE Osmonics (Minnetonka, Minn.), SWNF membranes from the Dow Chemical Company (Midland, Mich.) Filmtec line, DK series or SeaSoft membranes from GE Osmonics (Minnetonka, Minn.), and seawater NF membranes from Toray (Poway, Calif.). GE Osmonics membranes may have a particularly high sulfate rejection that is relatively independent of feed concentration. This allows use of two or more stages of NF to achieve high recovery.

Advantageously, the removal of a substantial portion of the calcium and magnesium in NF section 42 greatly reduces the quantity of chemicals required in the conventional purification stage of salt plant. Calculations show that for a desalination plant producing 106,000 m$^3$ of pure water per day or 854,000 tons per year of salt, the chemical savings are substantial. Without NF section 42, the amount of NaOH and $Na_2CO_3$ to remove bivalent ions to (a) avoid scaling in crystallizers and (b) keep purge from crystallizer (discussed further below) to a minimum would be 329,411 tons/yr NaOH consumption and 92,927 tons/yr $Na_2CO_3$ consumption. The corresponding figures calculated for a stream treated with NF section 42 as described herein are 0 tons/yr NaOH consumption and 0 tons/yr of $Na_2CO_3$ consumption, so that the incremental chemical savings are 329,411 tons/yr of NaOH and 92,927 tons/yr of $Na_2CO_3$. At a price of $0.10/kg for NaOH and $0.25/kg for $Na_2CO_3$, this translates into annual savings of $32.94 million for NaOH and $23.23 million for $Na_2CO_3$. In addition to the direct chemical savings, by arranging that the purification step treats a generally lower level of bivalent impurities, the stream that passes to the crystallizer can be dependably processed with greatly decrease scaling propensity, and operated with smaller volume, less frequent purges while assuring that the remaining impurities do not reach a concentration that would interfere with crystallization or impair purity of the salt product.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method of producing salt comprising:
    directing a saltwater desalination plant reject stream into a salt plant feed stream;
    selectively filtering said salt plant feed stream to remove scaling species, wherein said filtering step comprises directing said salt plant feed stream through a nanofiltration section to produce a filtered feed stream wherein at least 90% of the calcium and at least about 98% of the magnesium has been removed from said salt plant feed stream in said nanofiltration section;
    processing said filtered feed stream by directing said filtered feed stream through a membrane-based concentrator section to produce a concentrated stream;
    directing said concentrated stream to an evaporator section, wherein a high purity moist salt or slurry is produced; and
    directing said high purity moist salt or slurry to a crystallizer section, wherein said salt is produced, wherein said nanofiltration section is operated at a pH that is less than about 7.0 to enhance calcium and magnesium removal.

2. The method of claim 1 wherein said selective filtering removes at least about 99% of the sulfates from said salt plant feed stream.

3. The method of claim 2 wherein said selective filtering removes at least about 99.9% of the sulfates from said salt plant feed stream.

4. The method of claim 1 wherein said selective filtering removes at least about 95% of the calcium from said salt plant feed stream.

5. The method of claim 1 wherein said nanofiltration section is a 2-PASS nanofiltration system.

6. The method of claim 1 wherein said membrane-based concentrator section comprises a reverse osmosis section.

7. The method of claim 6 wherein said reverse osmosis section comprises a third stage that is a high pressure brine recovery stage.

8. The method of claim 1, wherein said nanofiltration section is operated at a pH that is less than about 6.5 to enhance calcium and magnesium removal.

9. A method of producing salt comprising:
  directing a saltwater desalination plant reject stream into a salt plant feed stream;
  selectively filtering said salt plant feed stream to remove scaling species, wherein said filtering step comprises directing said salt plant feed stream through a nanofiltration section to produce a filtered feed stream wherein at least 90% of the calcium and at least about 98% of the magnesium has been removed from said salt plant feed stream in said nanofiltration section;
  and processing said filtered feed stream by directing said filtered feed stream through a membrane-based concentrator section to produce a concentrated stream, wherein said nanofiltration section is operated at a pH that is less than about 7.0 to enhance calcium and magnesium removal.

10. The method of claim 9 wherein said method further comprises:
  directing said concentrated stream to an evaporator section, wherein a high purity moist salt or slurry is produced; and
  directing said high purity moist salt or slurry to a crystallizer section, wherein said salt is produced.

11. The method of claim 9 wherein said nanofiltration section is operated at a pH that is less than about 6.5 to enhance calcium and magnesium removal.

\* \* \* \* \*